United States Patent
Park et al.

(10) Patent No.: US 10,951,734 B1
(45) Date of Patent: Mar. 16, 2021

(54) CLIENT ELECTRONIC DEVICE, A VEHICLE, AND A METHOD OF CONTROLLING THE SAME

(71) Applicants: HYUNDAI MOTOR COMPANY, Seoul (KR); KIA MOTORS CORPORATION, Seoul (KR)

(72) Inventors: Pilyong Park, Seoul (KR); Kangwoon Seo, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/782,639

(22) Filed: Feb. 5, 2020

(30) Foreign Application Priority Data

Aug. 21, 2019 (KR) ........................ 10-2019-0102057

(51) Int. Cl.
*H04L 29/08* (2006.01)

(52) U.S. Cl.
CPC ............ *H04L 67/325* (2013.01); *H04L 67/12* (2013.01); *H04L 67/16* (2013.01)

(58) Field of Classification Search
CPC .................................................. H04L 67/325
USPC ........................................................ 709/219
See application file for complete search history.

(56) References Cited

U.S. PATENT DOCUMENTS

| | | | | |
|---|---|---|---|---|
| 8,359,405 B1* | 1/2013 | Border | ................... | H04L 47/10 709/246 |
| 10,069,945 B1* | 9/2018 | Morris | ................... | H04L 69/16 |
| 10,834,265 B1* | 11/2020 | Antunes | ............. | H04L 65/1083 |
| 2006/0251086 A1* | 11/2006 | Ha | ...................... | H04L 12/2818 370/401 |

(Continued)

OTHER PUBLICATIONS

Allman, "A Web Server's View of the Transport Layer", 2000 (Year: 2000).*

(Continued)

*Primary Examiner* — Ondrej C Vostal
(74) *Attorney, Agent, or Firm* — Lempia Summerfield Katz LLC

(57) ABSTRACT

A client electronic device, and a vehicle including the client electronic device and a method of controlling the vehicle, are configured to provide redundancy by determining whether an abnormality occurs in a transport layer or an application layer according to whether a time out occurs. The vehicle includes a plurality of electronic devices each configured to supply at least one service and a client electronic device configured to receive the service from at least one of the plurality of electronic devices. The client electronic device may include a communicator configured to communicate with the plurality of electronic devices and a controller. The controller may be configured to: control the communicator to transmit a service request message for a specific service to any one of the plurality of electronic devices; when receiving data corresponding to the service request message from one of the electronic devices, to (Continued)

determine whether a time out occurs for the reception of data; and, when the time out occurs, to control the communicator to transmit the service request message for the specific service to another electronic device of the plurality of electronic devices based on whether any one of a transport layer and an application layer is abnormal.

20 Claims, 5 Drawing Sheets

(56) References Cited

U.S. PATENT DOCUMENTS

| | | | | |
|---|---|---|---|---|
| 2007/0118843 A1* | 5/2007 | Seelig | .................... | G06F 9/4843 |
| | | | | 719/330 |
| 2012/0023254 A1* | 1/2012 | Park | ........................ | H04L 47/30 |
| | | | | 709/231 |
| 2013/0021968 A1* | 1/2013 | Reznik | ................. | H04L 45/245 |
| | | | | 370/328 |
| 2014/0304798 A1* | 10/2014 | Iyengar | .............. | H04L 63/1458 |
| | | | | 726/11 |
| 2014/0344379 A1* | 11/2014 | Chakraborti | .......... | H04L 65/403 |
| | | | | 709/206 |
| 2016/0088114 A1* | 3/2016 | Kim | .................... | H04L 67/1097 |
| | | | | 709/214 |
| 2016/0110239 A1* | 4/2016 | Couture | .............. | G06F 11/0709 |
| | | | | 714/37 |
| 2017/0359308 A1* | 12/2017 | Pal | ........................ | H04L 63/0281 |
| 2018/0253362 A1* | 9/2018 | Reinecke | ............ | G06F 9/45558 |
| 2019/0342417 A1* | 11/2019 | Gerdfeldter | ............. | H04L 69/28 |
| 2019/0364492 A1* | 11/2019 | Azizi | ................. | H04W 52/0264 |
| 2020/0152070 A1* | 5/2020 | Fraser | ................. | H04L 47/2408 |
| 2020/0296112 A1* | 9/2020 | Namboodiri | ........ | H04L 67/1095 |

OTHER PUBLICATIONS

Broadband Forum, "TR-069 CPE WAN Management Protocol", 2013 (Year: 2013).*
Cth et al., "Chapter 3: Transport Layer Part B", 2011 (Year: 2011).*
Eggert et al., "TCP User Timeout Option", RFC 5482, 2009 (Year: 2009).*
TCP-R: TCR Mobility Support for Continuous Operation, 1997 (Year: 1997).*
Information Sciences Institute, "Transmission Control Protocol", RFC 793, 1981 (Year: 1981).*
Merriam-Webster, "abnormal", 2020 (Year: 2020).*

* cited by examiner

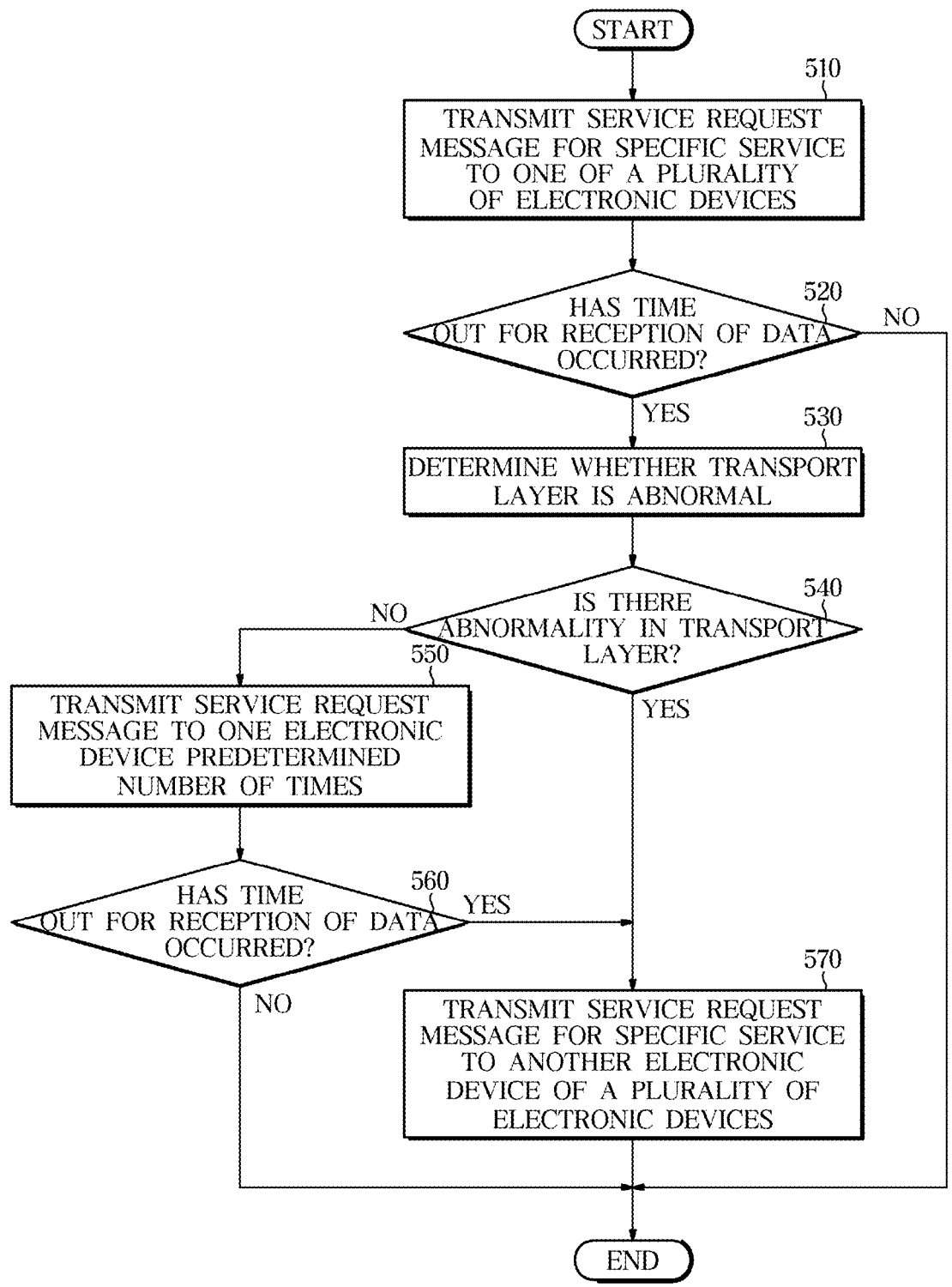

CLIENT ELECTRONIC DEVICE, A VEHICLE, AND A METHOD OF CONTROLLING THE SAME

CROSS-REFERENCE TO RELATED APPLICATION(S)

This application is based on and claims priority under 35 U.S.C. § 119 to Korean Patent Application No. 10-2019-0102057, filed on Aug. 21, 2019 in the Korean Intellectual Property Office, the disclosure of which is incorporated herein by reference in its entirety.

TECHNICAL FIELD

The disclosure relates to a client electronic device for providing communication with redundancy secured, and a vehicle including the client electronic device and a method of controlling the vehicle.

BACKGROUND

Generally, a vehicle includes a plurality of electronic devices. The plurality of electronic devices included in the vehicle may perform mutual communication based on a vehicle communication network.

Recently, in vehicle communication, a signal-oriented communication protocol for periodically transmitting and receiving signals has shifted to a service-oriented communication protocol for transmitting and receiving signals according to service needs. In order to secure safety of autonomous driving functions, research on securing redundancy of communication has been actively conducted.

However, the existing redundancy has a problem of inefficiency of using traffic or resources in a fixed manner by duplexing transmission nodes and duplication of communication data.

SUMMARY

Therefore, it is an aspect of the disclosure to provide a client electronic device for providing redundancy by determining whether an abnormality occurs in a transport layer or an application layer according to whether a time out occurs. It is also an aspect of the disclosure to provide a vehicle including the client electronic device and a method of controlling the vehicle.

Additional aspects of the disclosure are set forth in part in the description which follows and, in part, should be apparent from the description or may be learned by practice of the disclosure.

In accordance with an aspect of the disclosure, a vehicle includes a plurality of electronic devices each configured to supply at least one service and a client electronic device configured to receive the service from at least one of the plurality of electronic devices. The client electronic device may include a communicator configured to communicate with the plurality of electronic devices. The client electronic device may also include a controller configured to: control the communicator to transmit a service request message for a specific service to any one of the plurality of electronic devices; when receiving data corresponding to the service request message from one of the electronic devices, to determine whether a time out occurs for the reception of data; and, when the time out occurs, to control the communicator to transmit the service request message for the specific service to another electronic device of the plurality of electronic devices based on whether any one of a transport layer and an application layer is abnormal.

When the time out occurs, the controller may be configured to determine whether a transport layer between the one electronic device and the client electronic device is abnormal.

The controller may be configured to control the communicator to transmit a message confirming whether the transport layer is connected to the any one electronic device to determine whether the transport layer is abnormal, and to determine whether the transport layer is abnormal based on an acknowledgment within a predetermined time.

When there is an abnormality in the transport layer, the controller may be configured to control the communicator to transmit the service request message to another electronic device.

When there is no abnormality in the transport layer, the controller may be configured to control the communicator to repeatedly transmit the service request message to one electronic device. After transmitting the service request message a predetermined number of times, when data corresponding to the service request message is not received, the controller may be configured to control the communicator to transmit the service request message to another electronic device.

The controller is configured to control the communicator to transmit a message for service discovery to the plurality of electronic devices, and to control the communicator to receive a service providing message. The service providing message may include information about a service that can be provided from each of the plurality of electronic devices.

The controller is configured to determine another electronic device providing the specific service of the plurality of electronic devices based on the service providing message received from each of the plurality of electronic devices, and to control the communicator to transmit the service request message to another electronic device.

In accordance with another aspect of the disclosure, a client electronic device is provided in a vehicle and configured to receive a service from at least one of a plurality of electronic devices provided in the vehicle. The client electronic device includes a communicator configured to communicate with the plurality of electronic devices. The client electronic device also includes a controller configured to: control the communicator to transmit a service request message for a specific service to any one of the plurality of electronic devices; when receiving data corresponding to the service request message from one of the electronic devices, to determine whether a time out occurs for the reception of data; and, when the time out occurs, to control the communicator to transmit the service request message for the specific service to another electronic device of the plurality of electronic devices based on whether any one of a transport layer and an application layer is abnormal.

When the time out occurs, the controller may be configured to determine whether a transport layer between the one electronic device and the client electronic device is abnormal.

The controller may be configured to control the communicator to transmit a message confirming whether the transport layer is connected to the any one electronic device to determine whether the transport layer is abnormal, and to determine whether the transport layer is abnormal based on an acknowledgment within a predetermined time.

When there is an abnormality in the transport layer, the controller may be configured to control the communicator to transmit the service request message to another electronic device.

When there is no abnormality in the transport layer, the controller may be configured to control the communicator to repeatedly transmit the service request message to one electronic device. After transmitting the service request message a predetermined number of times, when data corresponding to the service request message is not received, the controller may be configured to control the communicator to transmit the service request message to another electronic device.

The controller may be configured to control the communicator to transmit a message for service discovery to the plurality of electronic devices, and to control the communicator to receive a service providing message. The service providing message may include information about a service that can be provided from each of the plurality of electronic devices.

The controller may be configured to determine another electronic device providing the specific service of the plurality of electronic devices based on the service providing message received from each of the plurality of electronic devices, and to control the communicator to transmit the service request message to another electronic device.

In accordance with another aspect of the disclosure, in a method of controlling a vehicle, the vehicle includes a plurality of electronic devices each configured to supply at least one service and a communicator configured to communicate with the plurality of electronic devices. The method includes: controlling, by a controller, the communicator to transmit a service request message for a specific service to any one of the plurality of electronic devices; when receiving data corresponding to the service request message from one of the electronic devices, determining, by the controller, whether a time out occurs for the reception of data; and, when the time out occurs, controlling, by the controller, the communicator to transmit the service request message for the specific service to another electronic device of the plurality of electronic devices based on whether any one of a transport layer and an application layer is abnormal.

The controlling of the communicator to transmit the service request message to another electronic device may include: determining whether a transport layer between the one electronic device and the client electronic device is abnormal; and, when there is an abnormality in the transport layer, controlling the communicator to transmit the service request message to another electronic device.

The determining of whether the transport layer is abnormal may include: controlling the communicator to transmit a message confirming whether the transport layer is connected to the any one electronic device to determine whether the transport layer is abnormal; and determining whether the transport layer is abnormal based on an acknowledgment within a predetermined time.

The controlling of the communicator to transmit the service request message to another electronic device may include: when there is no abnormality in the transport layer, controlling the communicator to repeatedly transmit the service request message to one electronic device; and, after transmitting the service request message a predetermined number of times, when data corresponding to the service request message is not received, controlling the communicator to transmit the service request message to another electronic device.

The method may further include: controlling, by the controller, the communicator to transmit a message for service discovery to the plurality of electronic devices; and controlling, by the controller, the communicator to receive a service providing message including information about a service that can be provided from each of the plurality of electronic devices.

The controlling of the communicator to transmit the service request message to another electronic device may include: determining another electronic device providing the specific service of the plurality of electronic devices based on the service providing message received from each of the plurality of electronic devices; and controlling the communicator to transmit the service request message to another electronic device.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 5 is a flowchart illustrating a case in which data for a service is received in a control method of a vehicle according to embodiments of the disclosure.

DETAILED DESCRIPTION

Figure 1:
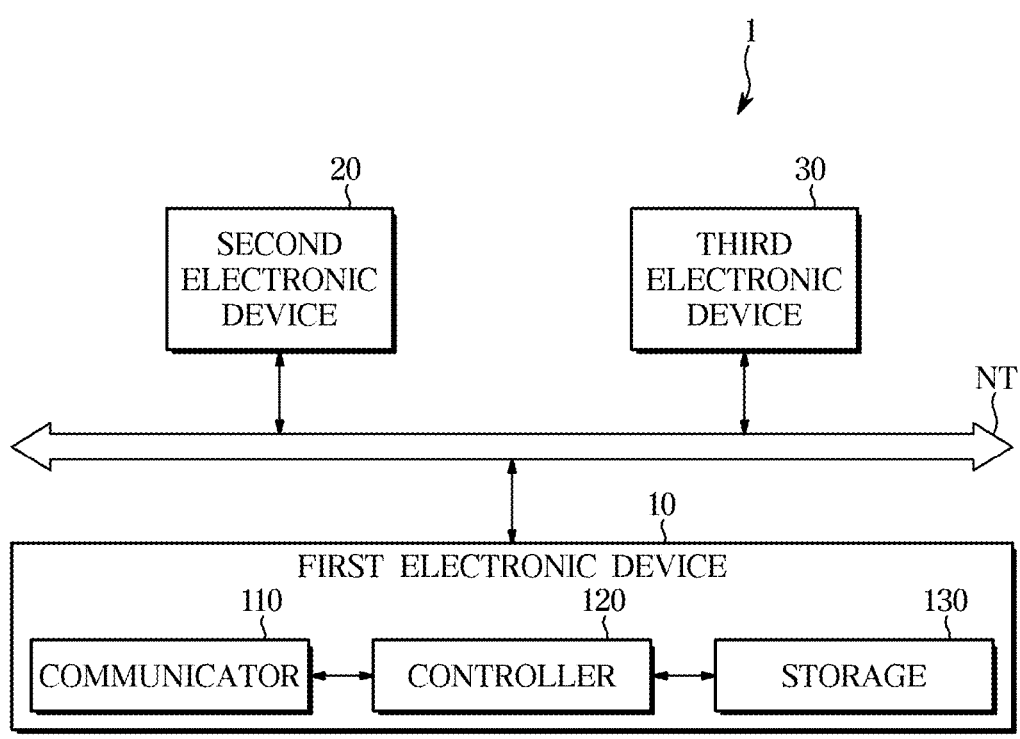
FIG. 1 is a control block diagram of a vehicle according to embodiments of the disclosure.

Like numbers refer to like elements throughout this specification. This specification does not describe all components of the embodiments, and general information in the technical field to which the disclosure belongs or overlapping information between the embodiments is not described.

It should be understood that, when a component is referred to as being "connected" to another component, it can be directly or indirectly connected to the other component. When a component is indirectly connected to another component, it may be connected to the other component through a wireless communication network.

Further, it should be understood that the terms "includes," "comprises," "including," and/or "comprising," when used in this specification, specify the presence of a stated component, but do not preclude the presence or addition of one or more other components.

Still further, it is to be understood that the singular forms "a," "an," and "the" include plural referents unless the context clearly dictates otherwise.

As used herein, the terms "portion," "unit," "block," "member," or "module" refer to a unit that can perform at least one function or operation. For example, these terms may refer to at least one piece of software stored in a memory or at least one piece of hardware, such as a Field Programmable Gate Array (FPGA) or an Application Specific Integrated Circuit (ASIC), or at least one process that is processed by a processor.

Reference numerals used in operations are provided for convenience of description, without describing the order of the operations. The operations can be executed in a different order from the stated order unless a specific order is definitely specified in the context.

Hereinafter, embodiments of a vehicle and a method of controlling the vehicle according to aspects of the disclosure are described in detail with reference to the accompanying drawings.

FIG. 1 is a control block diagram of a vehicle according to embodiments of the disclosure.

Referring to FIG. 1, a vehicle 1 may include a plurality of electronic devices. For example, the vehicle 1 may further include: an Engine Management System (EMS); a Transmission Controller, also referred to as a Transmission Control Unit (TCU); an Electronic Brake Controller, also referred to as an Electronic Brake Control Module (EBCM); an Electronic Power Steering (EPS) device; a Body Control Module (BCM); and a Driver Assistance System (DAS).

The type of electronic device included in the vehicle 1 is not limited to the above examples, and may include any type of electronic device that may be installed in the vehicle 1 for driving and operation of the vehicle 1.

The above-mentioned electronic devices may communicate with each other through a vehicle communication network NT. For example, the electronic devices may perform data communication through Ethernet, Media Oriented Systems Transport (MOST), a FlexRay, a Controller Area Network (CAN), a Local Interconnect Network (LIN), or the like.

For convenience of description, hereinafter, the vehicle 1 may include a first electronic device 10, a second electronic device 20, and a third electronic device 30. However, the vehicle 1 of the disclosure may not include only three electronic devices. The number of electronic devices included in the vehicle 1 is not limited.

In addition, below, the description is based on the premise that the first electronic device 10 corresponds to a client electronic device which requires a service, and that the second electronic device 20 and the third electronic device 30 correspond to a server electronic device providing a service required by the first electronic device 10. However, each of the electronic devices 10, 20, and 30 may correspond to the client electronic device that requires the service or the server electronic device that provides the service according to the operation contents. In other words, each of the electronic devices 10, 20, and 30 may serve as a service provider or a service consumer.

Hereinafter, the configuration of the electronic device is described in detail with respect to the first electronic device 10.

The first electronic device 10 may include a communicator 110 connected to the vehicle communication network NT to communicate with other electronic devices 20 and 30. The first electronic device may also include a controller 120 for controlling the communicator 110 to secure redundancy in performing communication and a storage 130 for storing various types of information necessary for the operation of the first electronic device 10.

The communicator 110 may be connected to the vehicle communication network NT to communicate with other electronic devices 20 and 30.

In particular, the communicator 110 may perform a service-oriented communication with the second electronic device 20 and the third electronic device 30. In other words, the communicator 110 may request data from the second electronic device 20 or the third electronic device 30 when an event requiring the service generates under the control of the controller 120.

The service-oriented communication may perform data exchange between the plurality of electronic devices 10, 20, and 30 through a service discovery process and a data access process. An interface for the service-oriented communication may be provided by a service-oriented middleware over internet protocol (SOME/IP). In addition to the SOME/IP, various protocols may be applied to provide the service-oriented communication.

The controller 120 may control the communicator 110 to transmit a message for service discovery to the plurality of electronic devices 20 and 30. The controller 120 may control the communicator 110 to receive a service providing message including information about a service that can be provided from each of the plurality of electronic devices 20 and 30.

In this case, the service providing message may include an address of an electronic device, which is a subject of transmission and an identifier for a service that can be provided.

The controller 120 may store information about the service provided by each electronic device 20 or 30 in the storage 130 based on the service providing message received from each of the plurality of electronic devices 20 and 30.

The controller 120 may control the communicator 110 to transmit a service request message for a specific service to any one of the plurality of electronic devices 20 and 30 (e.g., the second electronic device 20) for operation.

In other words, the controller 120 may determine one of the electronic devices (e.g., the second electronic device 20) that provides a service necessary for the operation of the first electronic device 10 based on information about a service provided by each of electronic devices 20 and 30 stored in the storage 130. The controller 120 may control the communicator 110 to transmit the service request message for a required service to any one of the determined electronic devices.

In such a case, the service request message may include information about a service identifier corresponding to the requesting service.

In this way, the first electronic device 10 may receive a service data message including data corresponding to the service request message from any one of the determined electronic devices.

The controller 120 may determine whether a time out for reception of data corresponding to the service request message occurs in order to secure redundancy of data transmission and reception.

In other words, when the data corresponding to the service request message is received, the controller 120 may determine that the time out has occurred when data is not received for a predetermined time after the service request message is transmitted.

When the time out occurs, the controller 120 may control the communicator 110 to transmit the service request message for the specific service to another electronic device (e.g., the third electronic device 30) of the plurality of electronic devices 20 and 30 based on at least one of the transport layer and the application layer is abnormal.

In other words, when the controller 120 does not receive the data corresponding to the service request message for the specific service from any one of the determined electronic devices, the controller 120 may determine whether each of the transport layers between the first electronic device 10 and any one of the determined electronic devices and each of the application layers of any one of the determined electronic devices is abnormal.

When it is determined that at least one of the transport layers and the application layers is abnormal, the controller 120 may control the communicator 110 to transmit the service request message for the specific service to another electronic device.

In this case, the controller 120 may determine another electronic device that provides the specific service required for the operation of the first electronic device 10 based on information, stored in the storage 130, about the service provided by each of the electronic devices 20 and 30. The controller 120 may control the communicator 110 to transmit the service request message for the specific service required by any one of the determined electronic devices.

Determining whether any of the transport layers or application layers is abnormal is described in detail below.

The controller 120 may include at least one memory storing a program for performing the above-described operations and operations, which is described below, and at least one processor for executing the stored program. When there are a plurality of the memories and processors, they may be integrated into one chip or provided at physically separated positions.

The storage 130 may store various pieces of information necessary for driving the first electronic device 10. The storage 130 may store information about the service provided by each of electronic devices 20 and 30 based on the service providing message obtained from each of the plurality of electronic devices 20 and 30. In this case, the information about the service provided by each of the electronic devices 20 and 30 may include the address of the electronic device and identifier information about the service provided by the corresponding electronic device by matching.

The storage 130 may be implemented with at least one of a non-volatile memory device, such as a cache, read only memory (ROM), programmable ROM (PROM), erasable programmable ROM (EPROM), and electrically erasable programmable ROM (EEPROM) The storage 130 may be implemented with at least one of a volatile memory device, such as random access memory (RAM), or a storage medium, such as hard disk drive (HDD) and compact disk (CD) ROM, without being limited thereto.

The storage 130 may be a memory implemented in a separate chip and may be implemented as a single chip with a processor corresponding to the controller 120.

The description of the configuration of the first electronic device 10 described above may be equally applicable to the respective configurations of the second electronic device 20 and the third electronic device 30.

Hereinafter, it is described in detail to determine whether an abnormality of one of the transport layers or the application layers based on the time out that occurs when the first electronic device 10 receives data about the specific service from the second electronic device 20.

Figure 2:
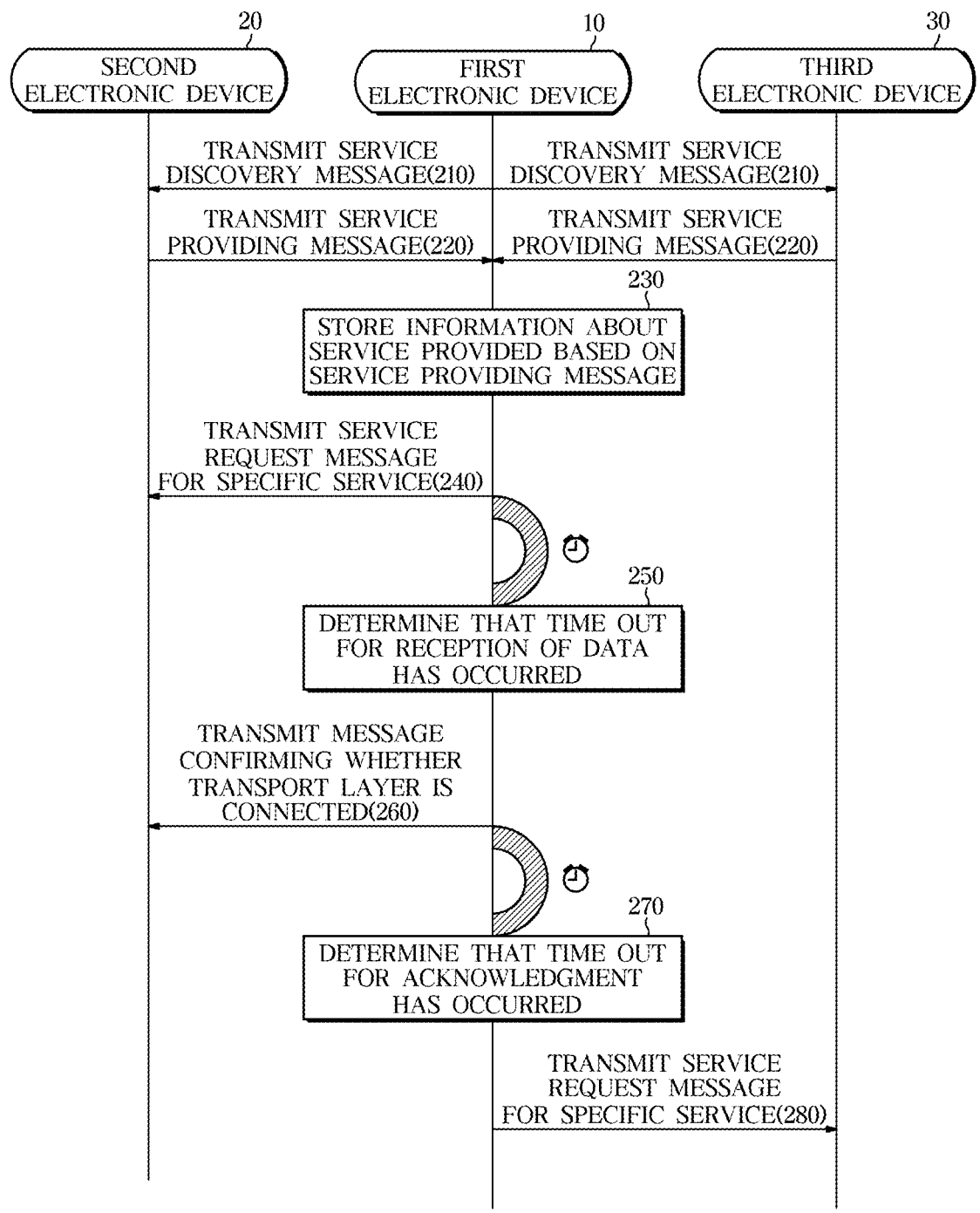
FIG. 2 is a view illustrating signal flow of a case in which a first electronic device determines whether a transport layer is abnormal according to embodiments of the disclosure.
Figure 3:
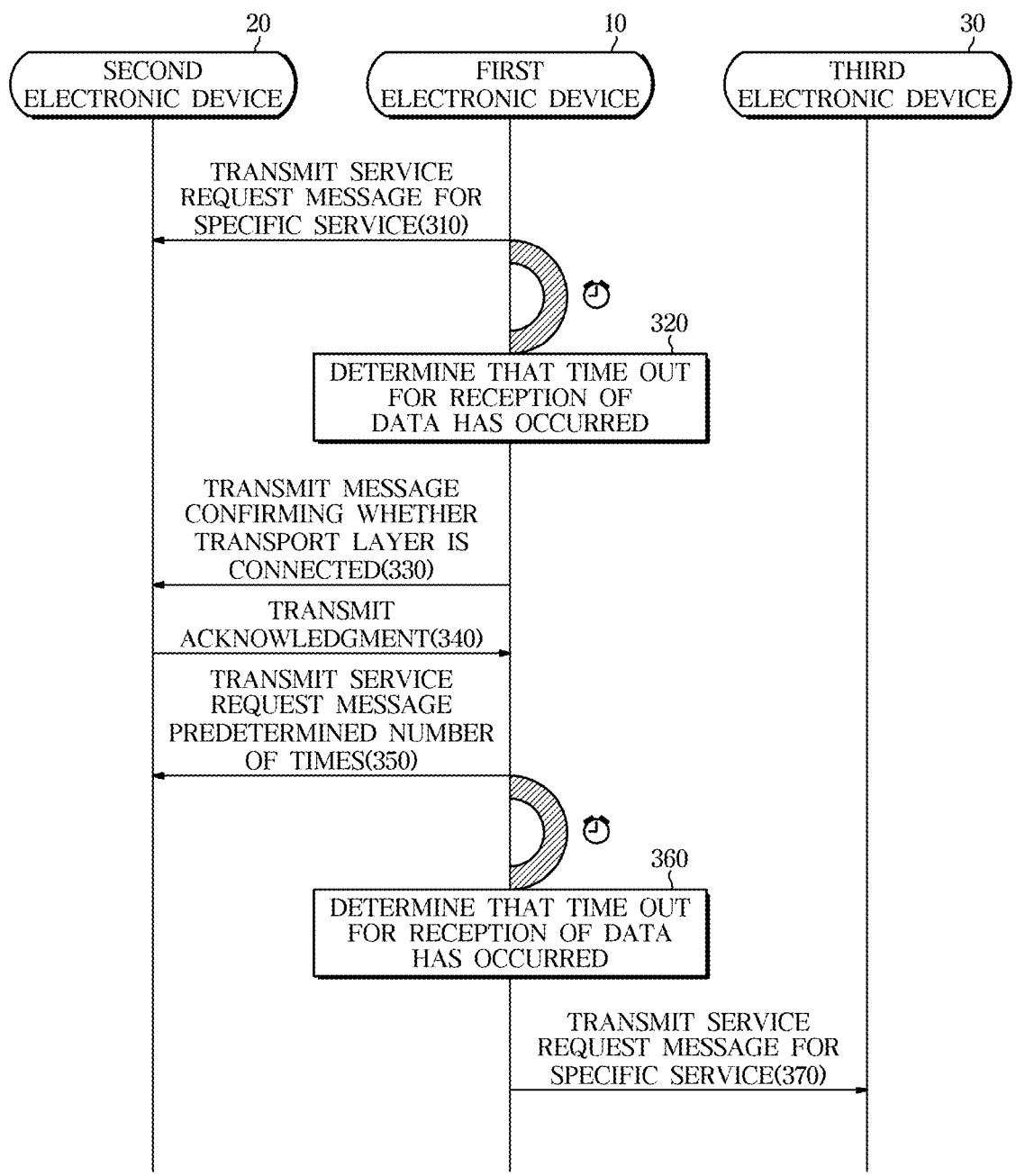
FIG. 3 is a view illustrating signal flow of a case in which a first electronic device determines whether an application layer is abnormal according to embodiments of the disclosure.

FIG. 2 is a view illustrating signal flow of a case in which a first electronic device determines whether a transport layer is abnormal according to embodiments of the disclosure. FIG. 3 is a view illustrating signal flow of a case in which a first electronic device determines whether an application layer is abnormal according to embodiments of the disclosure.

Referring to FIG. 2, the first electronic device 10 may transmit the message for service discovery to the plurality of electronic devices 20 and 30 (210).

Upon receiving the message for service discovery, the plurality of electronic devices 20 and 30 may transmit the service providing message to the first electronic device 10 (220).

The service providing message may include the address of the electronic device that is the subject of transmission and the identifier for the service that can be provided.

In this case, the first electronic device 10 may store information about the service provided based on the service providing message (230).

In other words, the storage 130 of the first electronic device 10 may store information about the service provided by each of electronic devices 20 and 30 based on the service providing message obtained from each of the plurality of electronic devices 20 and 30. In this case, the information about the service provided by each of the electronic devices 20 and 30 may include the address of the electronic device and identifier information about the service provided by the corresponding electronic device by matching.

The first electronic device 10 may control the communicator 110 to transmit the service request message for the specific service to any one of the plurality of electronic devices 20 and 30 (e.g., the second electronic device 20) for operation (240).

In other words, the controller 120 may determine one of the electronic devices (e.g., the second electronic device 20) that provides the service necessary for the operation of the first electronic device 10 based on information about the service provided by each of electronic devices 20 and 30 stored in the storage 130. The controller 120 may control the communicator 110 to transmit the service request message for the required service to any one of the determined electronic devices.

In this case, the service request message may include information about the service identifier corresponding to the requesting service.

In this way, the first electronic device 10 may receive the service data message including data corresponding to the service request message from any one of the determined electronic devices.

The first electronic device 10 may determine whether the time out for reception of data corresponding to the service request message occurs in order to secure redundancy of data transmission and reception.

In other words, when the data corresponding to the service request message is received, the first electronic device 10 may determine that the time out for reception of data has occurred when data is not received for the predetermined time after the service request message is transmitted (250).

When the time out occurs, the first electronic device 10 may transmit a message confirming whether the transport layer (e.g., a transmission control protocol (TCP) layer) between the first electronic device 10 and the second electronic device 20 is connected to the second electronic device 20 (260).

When an acknowledgment (ack) corresponding to the message confirming whether the transport layer is connected is not received for the predetermined time after the message is transmitted, the first electronic device 10 may determine that the time out for the acknowledgment has occurred (270).

In this case, the first electronic device 10 may determine that there is an abnormality in the transport layer of the second electronic device 20 and may transmit the service request message for the specific service to another electronic device (e.g., third electronic device 30) of the plurality of electronic devices 20 and 30 (280).

In this case, the controller 120 may determine another electronic device that provides the specific service required for the operation of the first electronic device 10 based on information about the service provided by each of the electronic devices 20 and 30 stored in the storage 130. The controller 120 may control the communicator 110 to transmit the service request message for the specific service required by any one of the determined electronic devices.

In other words, when the time out occurs because the first electronic device 10 does not receive data corresponding to the specific service from the second electronic device 20 providing the specific service, the first electronic device 10 may determine whether the transport layer is abnormal. When the abnormality of the layer is determined, the first electronic device 10 may transmit the service request message to the third electronic device 30 in order to receive data corresponding to the specific service from the third electronic device 30 providing the same service.

Through this, the first electronic device 10 may secure redundancy for the specific service.

When it is determined that there is no abnormality of the transport layer of the second electronic device 20, the first electronic device 10 may determine whether the application layer of the second electronic device 20 is abnormal.

Referring to FIG. 3, as described above, after transmitting the service request message for the specific service to the second electronic device 20 (310), the first electronic device 10 may determine that the time out for the reception of data has occurred (320), when data corresponding to the service request message has not been received before the predetermined time elapses. The first electronic device 10 may transmit the message confirming whether the transport layer is connected to the second electronic device 20 (330).

In this case, when there is no abnormality in the transport layer, the second electronic device 20 may transmit the acknowledgment for the message confirming whether the transport layer is connected to the first electronic device 10 (340).

When receiving the acknowledgment from the second electronic device 20, the first electronic device 10 may transmit the service request message to the second electronic device 20 a predetermined number of times (350).

At this time, after transmitting the service request message the predetermined number of times, when it does not receive the data corresponding to the service request message for the predetermined time, the first electronic device 10 may determine that the time out for the reception of data has occurred (360).

In other words, when the first electronic device 10 does not receive data corresponding to the service request message for the predetermined time after transmitting the service request message corresponding to the end of the predetermined number of times, the first electronic device 10 may determine that the time out has occurred.

When it is determined that the time out has occurred, the first electronic device 10 may transmit the service request message for the specific service to the third electronic device 30 (370).

In other words, when the first electronic device 10 determines that there is no abnormality of the transport layer of the second electronic device 20, the first electronic device 10 may transmit a predetermined number of service request messages to the second electronic device 20 to identify whether the application layer of the second electronic device 20 is abnormal. The first electronic device 10 may determine abnormality of an application layer of the second electronic device 20 when the time out occurs for data corresponding to the predetermined number of service request messages.

In this case, the first electronic device 10 may transmit the service request message to the third electronic device 30 to receive data corresponding to the specific service from the third electronic device 30 providing the same service. Through this, the first electronic device 10 may secure redundancy for the specific service.

Figure 4:
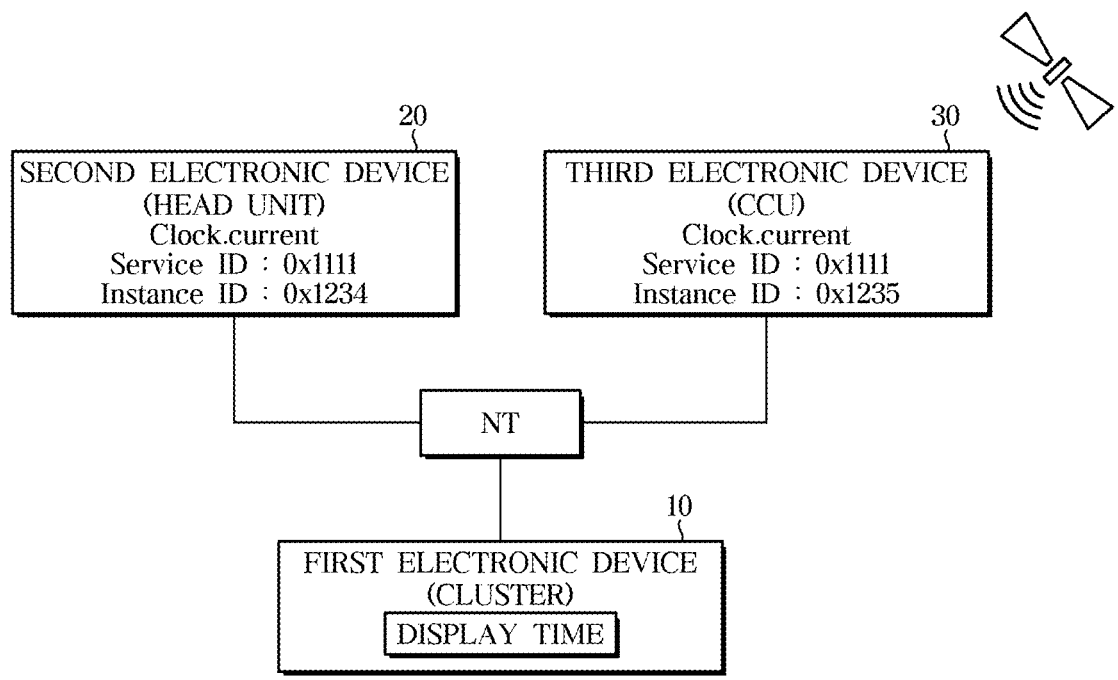
FIG. 4 is a view illustrating an example of a case in which a first electronic device requests a service according to embodiments of the disclosure.

FIG. 4 is a view illustrating an example of a case in which a first electronic device requests a service according to embodiments of the disclosure.

Referring to FIG. 4, the first electronic device 10 may correspond to a cluster. In this case, the first electronic device 10 may receive information (Clock. Current) of a current time from the second electronic device 20 corresponding to a head unit.

In this case, when the time out with respect to the information of the current time occurs, the first electronic device 10 may transmit the service request message for the information of the current time to the electronic device 30 (e.g., a connectivity unit (CCU)) providing the information of the current time based on whether the transport layer or the application layer of the second electronic device 20 is abnormal.

In this case, the service request message may include a service identifier (e.g., 0x1111) with respect to the information of the current time and an address (e.g., 0x1235) of the third electronic device 30.

Through this, the first electronic device 10 may secure redundancy with respect to the information of the current time.

As such, when the time out for the specific service occurs, by transmitting the service request message for the specific service to another electronic device of the plurality of electronic devices based on whether the transport layer or the application layer is abnormal, the electronic device included in the vehicle 1 can reduce network traffic and reduce resource usage of the controller 120 as compared with a technique of redundancy of a transmitting node to secure redundancy.

Hereinafter, a control method of the vehicle 1 is described. The vehicle 1 according to the above-described embodiment may be applied to the control method of the vehicle 1. Therefore, descriptions given above with reference to FIGS. 1-4 may be applied to the control method of the vehicle 1 in the same manner, unless otherwise noted.

FIG. 5 is a flowchart illustrating a case in which data for a service is received in a control method of a vehicle according to embodiments of the disclosure.

Referring to FIG. 5, the vehicle 1 may control the first electronic device 10 to transmit the service request message for the specific service to one of the plurality of electronic devices 20 and 30 (e.g., the second electronic device 20) (510).

When the time out for the reception of data corresponding to the service request message occurs in the first electronic device 10 (520), the vehicle 1 may determine whether the transport layer of the second electronic device 20 is abnormal (530).

When there is an abnormality in the transport layer (YES in 540), the vehicle 1 may control the first electronic device 10 to transmit the service request message for the specific service to another electronic device (e.g., the third electronic device 30) of the plurality of electronic devices 20 and 30 (570).

In addition, when there is no abnormality in the transport layer (NO in 540), the vehicle 1 may transmit the service request message to the one electronic device (e.g., the second electronic device 20) at the predetermined number of times (550).

At this time, when the time out for the reception of data occurs (YES in 560), the vehicle 1 may control the first electronic device 10 to transmit the service request message for the specific service to another electronic device (e.g., the third electronic device 30) of the plurality of electronic devices 20 and 30 (570).

According to the client electronic device, and the vehicle including the client electronic device and the method of controlling the vehicle according to the embodiments, by providing the redundancy by determining whether the abnormality is in the transport layer or the application layer according to whether the time out occurs, it is possible to secure communication reliability while reducing inefficiency of traffic or resources.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, and the like.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example and should not be interpreted in a limited sense.

What is claimed is:

1. A vehicle comprising:
   a plurality of electronic devices each configured to supply at least one service; and
   a client electronic device configured to receive the at least one service from at least one of the plurality of electronic devices,
   wherein the client electronic device comprises:
   a communicator configured to communicate with the plurality of electronic devices; and
   a controller configured to
      control the communicator to transmit a service request message for a specific service to any one of the plurality of electronic devices,
      when receiving data corresponding to the service request message from one of the electronic devices, determine whether a time out occurs for the reception of data, and
      when the time out occurs, control the communicator to transmit the service request message for the specific service to another electronic device of the plurality of electronic devices based on whether any one of a transport layer and an application layer is abnormal.

2. The vehicle according to claim 1, wherein, when the time out occurs, the controller is configured to determine whether a transport layer between the one electronic device and the client electronic device is abnormal.

3. The vehicle according to claim 2, wherein the controller is configured to:
   control the communicator to transmit a message confirming whether the transport layer is connected to the any one electronic device to determine whether the transport layer is abnormal; and
   determine whether the transport layer is abnormal based on an acknowledgment within a predetermined time.

4. The vehicle according to claim 2, wherein, when there is an abnormality in the transport layer, the controller is configured to control the communicator to transmit the service request message to another electronic device.

5. The vehicle according to claim 2, wherein the controller is configured to:
   when there is no abnormality in the transport layer, control the communicator to repeatedly transmit the service request message to one electronic device; and
   after transmitting the service request message a predetermined number of times, when data corresponding to the service request message is not received, control the communicator to transmit the service request message to another electronic device.

6. The vehicle according to claim 1, wherein the controller is configured to:
   control the communicator to transmit a message for service discovery to the plurality of electronic devices; and
   control the communicator to receive a service providing message including information about a service that can be provided from each of the plurality of electronic devices.

7. The vehicle according to claim 6, wherein the controller is configured to:
   determine another electronic device providing the specific service of the plurality of electronic devices based on the service providing message received from each of the plurality of electronic devices; and
   control the communicator to transmit the service request message to another electronic device.

8. A client electronic device provided in a vehicle and configured to receive a service from at least one of a plurality of electronic devices provided in the vehicle, the client electronic device comprising:
   a communicator configured to communicate with the plurality of electronic devices; and
   a controller configured to
      control the communicator to transmit a service request message for a specific service to any one of the plurality of electronic devices,
      when receiving data corresponding to the service request message from one of the electronic devices, determine whether a time out occurs for the reception of data, and
      when the time out occurs, control the communicator to transmit the service request message for the specific service to another electronic device of the plurality of electronic devices based on whether any one of a transport layer and an application layer is abnormal.

9. The client electronic device according to claim 8, wherein, when the time out occurs, the controller is configured to determine whether a transport layer between the one electronic device and the client electronic device is abnormal.

10. The client electronic device according to claim 9, wherein the controller is configured to:
    control the communicator to transmit a message confirming whether the transport layer is connected to the any one electronic device to determine whether the transport layer is abnormal; and
determine whether the transport layer is abnormal based on an acknowledgment within a predetermined time.

11. The client electronic device according to claim 9, wherein, when there is an abnormality in the transport layer, the controller is configured to control the communicator to transmit the service request message to another electronic device.

12. The client electronic device according to claim 9, wherein the controller is configured to:
when there is no abnormality in the transport layer, control the communicator to repeatedly transmit the service request message to one electronic device; and
after transmitting the service request message a predetermined number of times, when data corresponding to the service request message is not received, control the communicator to transmit the service request message to another electronic device.

13. The client electronic device according to claim 8, wherein the controller is configured to:
control the communicator to transmit a message for service discovery to the plurality of electronic devices; and
control the communicator to receive a service providing message including information about a service that can be provided from each of the plurality of electronic devices.

14. The client electronic device according to claim 13, wherein the controller is configured to:
determine another electronic device providing the specific service of the plurality of electronic devices based on the service providing message received from each of the plurality of electronic devices; and
control the communicator to transmit the service request message to another electronic device.

15. A method of controlling a vehicle, the vehicle including a plurality of electronic devices each configured to supply at least one service, and a communicator configured to communicate with the plurality of electronic devices, the method comprising:
controlling, by a controller, the communicator to transmit a service request message for a specific service to any one of the plurality of electronic devices;
when receiving data corresponding to the service request message from one of the electronic devices, determining, by the controller, whether a time out occurs for the reception of data; and
when the time out occurs, controlling, by the controller, the communicator to transmit the service request message for the specific service to another electronic device of the plurality of electronic devices based on whether any one of a transport layer and an application layer is abnormal.

16. The method according to claim 15, wherein the controlling of the communicator to transmit the service request message to another electronic device comprises:
determining whether a transport layer between the one electronic device and the client electronic device is abnormal; and
when there is an abnormality in the transport layer, controlling the communicator to transmit the service request message to another electronic device.

17. The method according to claim 16, wherein the determining of whether the transport layer is abnormal comprises:
controlling the communicator to transmit a message confirming whether the transport layer is connected to the any one electronic device to determine whether the transport layer is abnormal; and
determining whether the transport layer is abnormal based on an acknowledgment within a predetermined time.

18. The method according to claim 16, wherein the controlling of the communicator to transmit the service request message to another electronic device comprises:
when there is no abnormality in the transport layer, controlling the communicator to repeatedly transmit the service request message to one electronic device; and
after transmitting the service request message a predetermined number of times, when data corresponding to the service request message is not received, controlling the communicator to transmit the service request message to another electronic device.

19. The method according to claim 15, further comprising:
controlling, by the controller, the communicator to transmit a message for service discovery to the plurality of electronic devices; and
controlling, by the controller, the communicator to receive a service providing message including information about a service that can be provided from each of the plurality of electronic devices.

20. The method according to claim 19, wherein the controlling of the communicator to transmit the service request message to another electronic device comprises:
determining another electronic device providing the specific service of the plurality of electronic devices based on the service providing message received from each of the plurality of electronic devices; and
controlling the communicator to transmit the service request message to another electronic device.

* * * * *